United States Patent
Philipps et al.

[19]

[11] Patent Number: 5,889,754
[45] Date of Patent: Mar. 30, 1999

[54] MAGAZINE WITH A PLURALITY OF DISK DRAWERS

[75] Inventors: Bernd Philipps, Untergruppenbach; Michael Freund, Schorndorf; Michael Bidmon, Gosbach; Andreas Dickhoff, Kirchheim-Teck, all of Germany

[73] Assignee: Buro-und Datentechnik GmbH & Co. KG, Rottweil, Germany

[21] Appl. No.: 820,660

[22] Filed: Mar. 17, 1997

[30] Foreign Application Priority Data

Mar. 28, 1996 [DE] Germany ............ 196 12 380.1

[51] Int. Cl.[6] ............ G11B 17/08; G11B 33/02
[52] U.S. Cl. ............ 369/178; 369/75.1; 369/192
[58] Field of Search ............ 360/98.08, 99.02, 360/132, 137; 369/36, 75.1, 77.1, 77.2, 191, 192, 273, 292; 312/9.9

[56] References Cited

U.S. PATENT DOCUMENTS

| | | | |
|---|---|---|---|
| 4,800,554 | 1/1989 | Yamasaki et al. | 369/291 |
| 5,058,100 | 10/1991 | Yoshii | 369/36 |
| 5,200,938 | 4/1993 | Akiyama et al. | 369/36 |
| 5,247,406 | 9/1993 | Apple et al. | 369/34 |
| 5,255,251 | 10/1993 | Fitzgerald et al. | 369/36 |
| 5,267,225 | 11/1993 | Fukasawa et al. | 369/36 |
| 5,481,514 | 1/1996 | Yamasaki et al. | 369/36 |
| 5,576,911 | 11/1996 | Porter | 369/92 |

*Primary Examiner*—Stuart S. Levy
*Assistant Examiner*—Angel Castro
*Attorney, Agent, or Firm*—Higgs, Fletcher & Mack LLP; Bernard L. Kleinke

[57] ABSTRACT

The invention relates to a magazine having a plurality of disk drawers which are mounted in disk-holding compartments and each of which holds a single disk (CD), all of the disk drawers being lockable in and releasable from the magazine by means of a single, common disk drawer locking mechanism and the magazine being capable of insertion into a machine. In order to create a magazine of straightforward, compact and economical design having as few components and being as simple to assemble as possible, the disk drawer locking mechanism is integral with the magazine. The disk drawer locking mechanism and the magazine are constructed as a one-piece injection molded unit in plastic and the disk drawer locking mechanism has a locking catch and a release tab which are joined to the magazine or an outer panel of the magazine by means of a common, elastic fulcrum bar and which pivot conjointly around the centre axis of the fulcrum bar thereby acting against its spring action.

7 Claims, 3 Drawing Sheets

MAGAZINE WITH A PLURALITY OF DISK DRAWERS

FIELD OF THE INVENTION

The invention relates to a magazine having a plurality of disk drawers which are mounted in disk-holding compartments and each of which holds one disk.

There are known magazines of the generic type for data storage media such as compact disks, floppy disks and magnetic tape cassettes.

BACKGROUND OF THE INVENTION

U.S. Pat. No. 4,800,554 describes a magazine having a plurality of disk drawers, each holding one compact disk (CD) and being mounted in disk-holding compartments in which all disk drawers are locked in and released from the magazine by means of a single, common disk drawer locking mechanism and which is capable of being fitted in a recording/playback device for compact disks.

In this connection, the disk drawer locking mechanism includes a number of separate components.

Furthermore, the locking mechanism is constructed as a separate unit located on a mounting bracket by means of which it is attached to the magazine in the vicinity of an outer panel of the magazine provided with a cut-out.

The disk drawer locking mechanism has a component with a release tab and a locking catch which pivot around a fulcrum bolt attached to the mounting bracket, thereby acting against the force of a spring. The disadvantage of this design is the large number of separate components and the fact that the disk drawer locking mechanism has to be fitted to the magazine as a separate unit.

SUMMARY OF THE INVENTION

It is the object of the invention to create a magazine having a disk drawer locking mechanism of the type described above which, firstly, is simple, compact and economical in design, having a minimum of separate components and being as straightforward as possible in assembly, and, secondly, offers a secure and simple means of magazine handling as well providing a simple and secure means of loading and unloading individual disks either when outside of or inside a machine or in an automated environment.

This object is achieved in a magazine comprising means defining diskholding compartments each of which is adapted to hold a single disk, a plurality of disk drawers mounted in disk-holding compartments, a single common disk locking mechanism being lockable and releasable from the magazine, each disk drawer holding a single disk (CD), all of the disk drawers being lockable in and releasable from the magazine by the single, common disk drawer locking mechanism, and the single common disk drawer locking mechanism being integrally formed with the magazine.

Advantageously, the disk drawer locking mechanism and the magazine are constructed as a one-piece injection-molded unit made of plastic, the disk drawer locking mechanism having a release tab and a locking catch joined to the magazine or an outer panel of the magazine by means of a common, elastic fulcrum bar and pivoting conjointly around the centre axis of the fulcrum bar, thereby acting against its spring action.

Another feature of the invention is that the disk drawer locking mechanism is integral with the magazine carrying handle.

In an advantageous modification of the invention, the disk drawer locking mechanism, the carrying handle and the magazine are constructed as a one-piece injection-molded unit made of plastic.

In another advantageous modification of the invention, the release tab of the disk drawer locking mechanism functions as part of a magazine locking mechanism.

Other features and advantages of the invention are evident from the description of an embodiment of the invention illustrated in the drawings.

DETAILED DESCRIPTION OF THE INVENTION

The description which follows relates to a magazine 1 having a plurality of disk drawers 3 which are mounted in disk-holding compartments 2, all of the disk drawers being lockable in and releasable from the magazine by means of a single, common disk drawer locking mechanism 4 in the magazine 1. The magazine 1 is capable of being fitted in a machine (not illustrated), preferably a recording/playback device of the conventional type such as an archiving unit or a disk changer, and the disk stored in the magazine is a data storage medium in the form of a compact disk (CD).

It is obvious to a person skilled in the art that the disk drawer of the magazine as defined by the invention could also be used to store other disk-shaped data storage media such as gramophone records or floppy disks.

Figure 1:
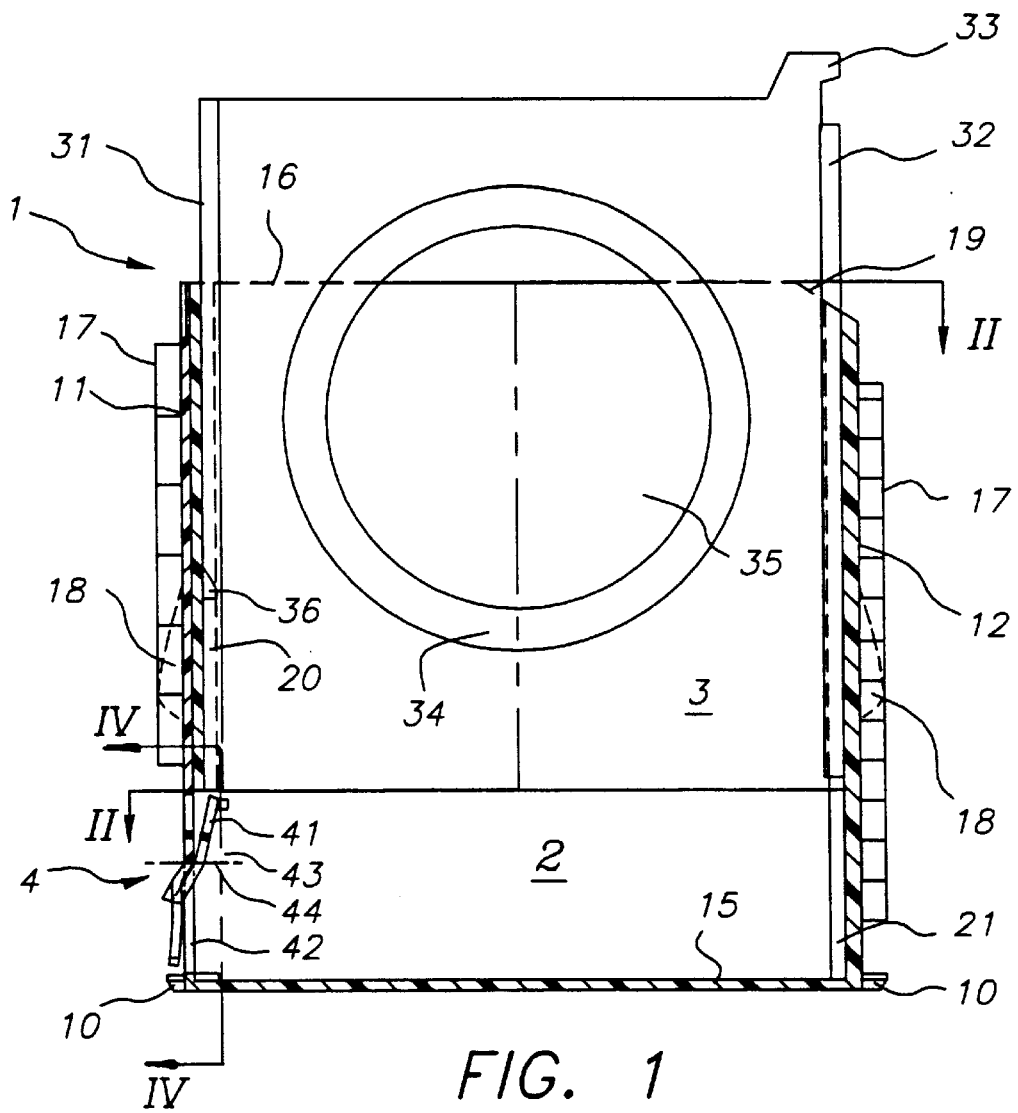
FIG. 1 shows a plan view of the magazine as described by the invention seen in cross-section along the line "I—I" of FIG. 2 and showing a disk drawer locking mechanism in accordance with the invention and a partially extended disk drawer.
Figure 2:
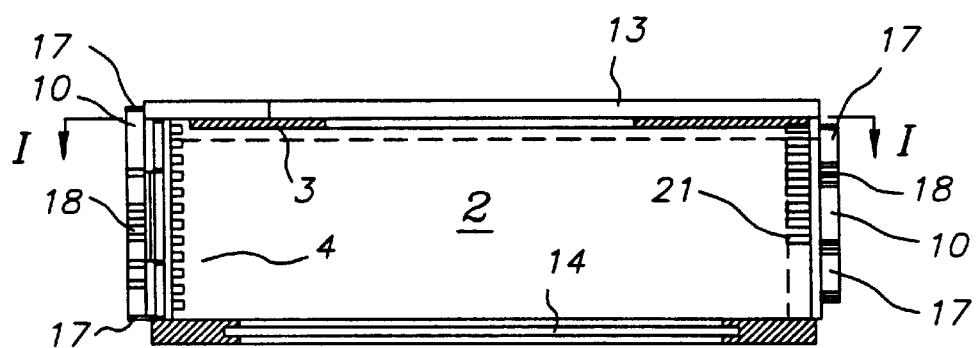
FIG. 2 shows a detail of the front view of the magazine as shown in FIG. 1 seen in cross-section along the line "II—II" of FIG. 1.

The magazine 1 illustrated in FIG. 1 is viewed from above in crosssection along line "I—I" as per FIG. 2. For the sake of clarity, only one of the many disk drawers 3 is shown and is illustrated without a compact disk CD in place and in a partially extended position in which the disk drawer locking mechanism 4 is not effective.

The magazine 1 as shown in FIGS. 1 and 2 includes two side panels 11 and 12, a top panel 13, a bottom panel 14, a rear panel 15 and an open front 16.

The magazine 1 is cubic in configuration and has a number of diskholding compartments 2 arranged one above the other and formed by raised guide rails 20, 21 on the inside of the side panels 11 and 12 and each of which can hold one disk drawer 3 which can be drawn outwards from the front of the magazine and holds one compact disk (CD). The guide rails 20 and 21 which are arranged adjacent to each other and one above the other form V-shaped guide slots 22 in which the parallel outer runners 31 and 32 of the disk drawers 3 run.

On the outside of the magazine side panels 11 and 12 and running parallel to the disk drawer guide rails 21 there are magazine guide rails 17 which fit into the guide slots (not illustrated) of a magazine holder on the machine into which the magazine 1 can be manually inserted. The magazine guide rails 17 are arranged asymmetrically relative to the height of the magazine and/or have differing cross-sectional dimensions (not illustrated) such that the magazine can not be inserted in the magazine holder the wrong way round.

On the outside of each of the side panels 11 and 12 there is also at least one saw-tooth shaped protrusion 18 which locks the magazine in the machine's magazine holder by engaging with a mating sawtooth-shaped spring or springs (not illustrated).

In the vicinity of the magazine front 16 there are firstly magazine insertion faces on the outside of both side panels 11 and 12 and secondly on one side panel 12 there is a 45-degree bevel 19 running the full height of the magazine such that when the disk drawers 3 are inserted fully into the magazine their locating tabs 33, which are positioned near the end of the outer runner 32, protrude from the magazine and can be engaged by a disk drawer extending mechanism (not illustrated) which is capable of movement in the vertical and horizontal planes relative to the magazine for the purpose of drawing out individual disk drawers.

In the vicinity of the magazine rear panel 15 on the outside of the magazine side panels 11 and 12 there are stop rails 10 which act as the limits to inward movement of the magazine into the magazine holder in the machine.

The disk drawer 3 shown in FIGS. 1 and 2 takes the form of a rectangular disk made of a plastic material. In the centre of the disk drawer there is a circular recess 34 having the diameter of a compact disk (CD) and in which the CD is placed and whose depth is greater than the thickness of one CD but less than the thickness of two CDs. The recess 34 has a beveled rim between the horizontal surface of the disk drawer 3 and the vertical side of the recess for the purpose of facilitating insertion of the CD.

In the bottom of the recess 34 there is a centrally positioned circular hole 35 such that a disk grab (not illustrated) can take hold of a CD lying in the recess 34 through the centre hole of the CD and the drawer hole 35.

On the outer runner 31 of the disk drawer 3 close to the end facing the rear panel 15 of the magazine there is a locating recess 36 for the disk drawer locking mechanism 4. The outer runners 31 and 32 are not as thick as the main body of the disk drawer 3 and the locating tab 33 and may also differ in thickness from one another in order to provide a means of ensuring that the disk drawer 3 is not inserted in the disk-holding compartments 2 of the magazine 1 the wrong way round.

Figure 3:
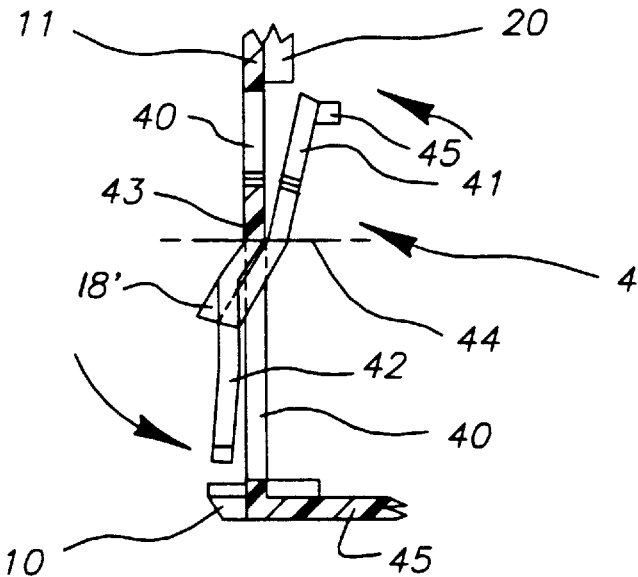
FIG. 3 shows an enlarged partial view of the disk drawer locking mechanism according to FIG. 1 seen in cross-section along line "I—I" of FIG. 2.
Figure 4:
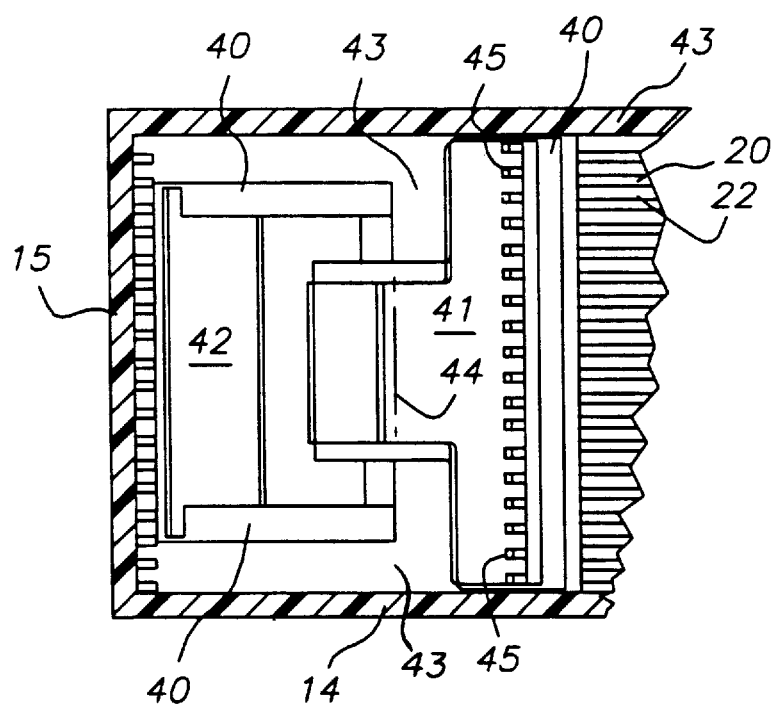
FIG. 4 shows an enlarged view of the disk drawer locking mechanism as shown in FIGS. 1 and 3 seen from the side in cross-section along line "III—III" of FIG. 1.

As shown in FIGS. 1, 3 and 4, the disk drawer locking mechanism 4 is located near the magazine rear panel 15 on one of the magazine side panels, in this instance side panel 11.

As shown in FIGS. 1, 2 and 4, the disk drawer locking mechanism 4 firstly locks all disk drawers 3 simultaneously in position when they are pushed fully home into the magazine when the magazine is not inside the machine's magazine holder and, secondly, releases all disk drawers simultaneously when the magazine is inserted into the magazine holder in the machine.

The disk drawer locking mechanism 4 is, as illustrated in Pigs. 3 and 4, integral with the magazine 1. In other words, the disk drawer locking mechanism 4 and the magazine 1 are constructed as a one-piece injection molded unit in a plastic material.

The disk drawer locking mechanism 4 includes a locking catch 41 which engages with the disk drawers 3 thereby locking them in place and formed by making cut-outs 40 in the magazine side panel, in this instance side panel 11, and a release tab 42 which releases the disk drawers. The locking catch and the release tab are joined to the magazine or its outer panel, in this instance side panel 11, by means of a common, elastic fulcrum bar 43 and conjointly pivot to a limited degree around its central axis 44, thereby acting against its spring action.

The locking catch 41 extends forwards from the fulcrum bar 43 towards the front of the magazine 16 while the release tab 42 extends rearwards towards the rear panel 15 of the magazine. The release tab and the locking catch may have a flat or an angled surface relative to the magazine side panel 11.

The fulcrum bar 43 extends vertically or at right angles to the disk drawer guide rails 20 and 21 between the upper and lower magazine guide rails 17. The strength of the spring or torsional force applied by the fulcrum bar 43 can be controlled by its dimensions and the properties of the material (modulus of elasticity, etc.).

At its outer end, the locking catch 41 extends vertically from the lowest to the highest disk drawer slot 22 while at its inner end where it joins the fulcrum bar 43 it is approximately half that height in order to make it easier to pivot. The inner end of the locking catch 41 extends beyond the fulcrum bar 43 and into the U-shaped inner end of the release tab 42 formed by making cut-outs 40 extending at right angles to the fulcrum bar 43.

When the release tab and locking catch are in their initial positions with the magazine 1 not being inserted in the machine, the locking catch 41 protrudes inwards into the magazine and, if the disk drawers 3 are pushed fully home into the magazine, engages with the outer edges/runners 31 of the disk drawers. The release tab 42, on the other hand, protrudes outwards from the magazine 1 or the side panel 11.

The locking catch 41 has locating tabs 45 or pins on its outer end which locate or engage in the locating recesses 36 of the disk drawers 3 thereby locking the disk drawers in the fully inserted position.

When the magazine 1 is inserted into the machine's magazine holder, shortly before the magazine locks into its fully inserted position, the release tab 42 is pushed inwards against the magazine side panel 11 by at least one fixed release cam (not illustrated) in the magazine holder and thus pivots the locking catch 41 against the spring action of the fulcrum bar 43 thereby lifting the locating tabs/pins 45 out of the locating recesses in the disk drawers 3.

The release tab 42 of the disk drawer locking mechanism 4 can also be operated manually when the magazine 1 is not in the machine's magazine holder.

Unintentional release of the locking mechanism is prevented by means of the magazine guide rails 17 and stop rails 10 arranged around the release tab.

Figure 5:
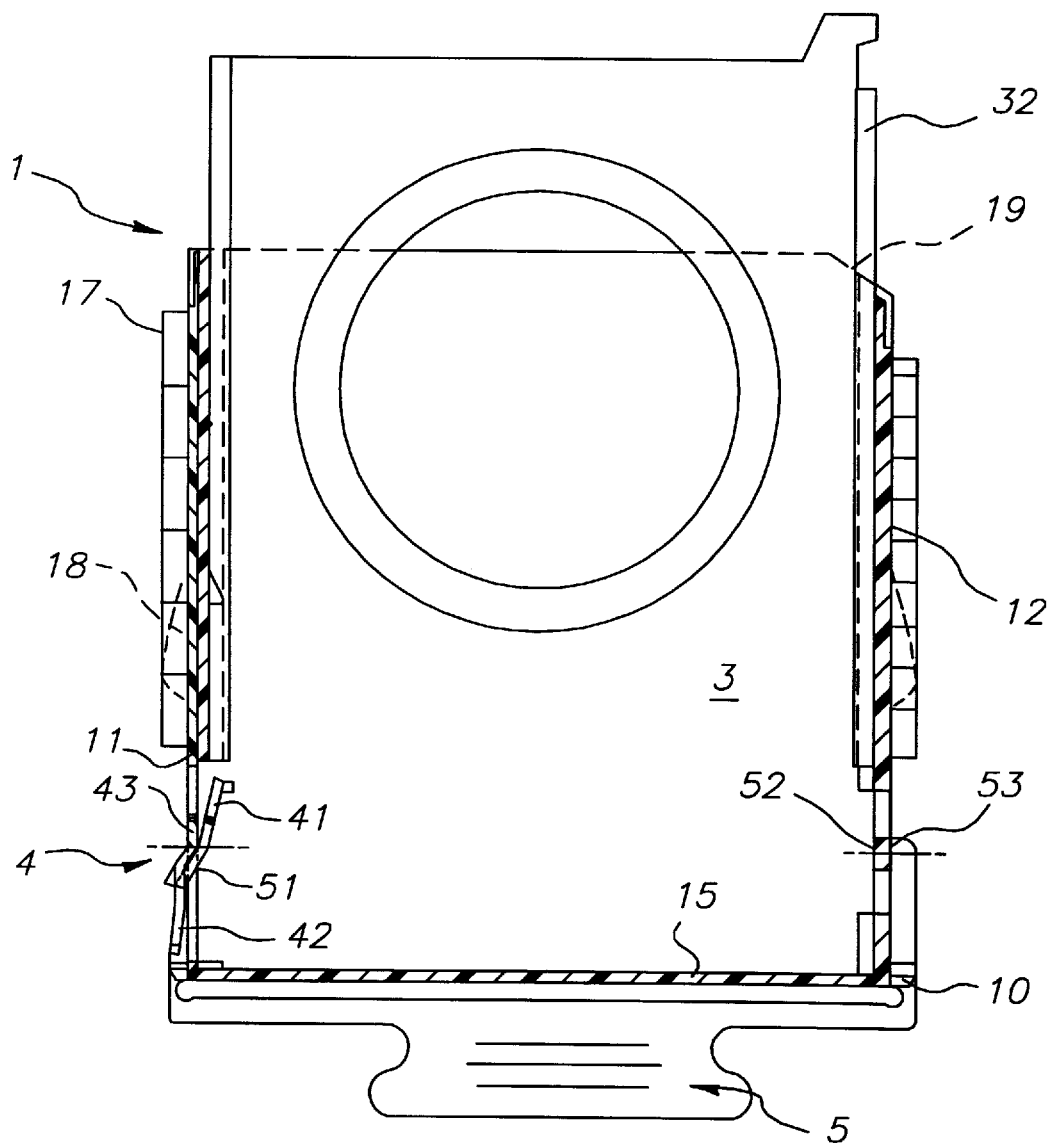
FIG. 5 shows a plan view of a further embodiment of the magazine as shown in FIGS. 1 to 4 having a carrying handle and seen in cross-section along line "I—I".

A further embodiment in accordance with the invention as illustrated in FIG. 5 involves a magazine 1 which has a carrying handle 5 in the vicinity of the rear panel 15. The carrying handle 5 is joined on one side to the disk drawer locking mechanism 4 and on the other to the magazine 1.

The disk drawer locking mechanism 4 in this case is integral either with the carrying handle 5 or the carrying handle 5 and the magazine 1. In other words, the disk drawer locking mechanism, the carrying handle and the magazine are constructed as a one-piece injection molded unit.

The carrying handle 5 takes the form of a U-bracket which encloses the magazine 1 and whose ends 51 and 52 are attached to opposite outer panels of the magazine, in this instance the side panels 11 and 12, and can be moved laterally at right angles to the side arms of the U-bracket against one of the outer panels, in this instance side panel 11, and against the spring action of an elastic element 43.

The first side arm of the carrying handle 5 forms a disk drawer locking mechanism 4 as described above and illustrated in FIGS. 1 to 4 in which the first side arm of the U-bracket forms the release tab 42 and can be moved laterally the side panel 11 of the magazine 1 and the second side arm of the U-bracket is joined to the opposite side panel 12 of the magazine 1 by means of a second fulcrum bar 53 and can be moved laterally away from the side panel 12.

Another embodiment of the disk drawer locking mechanism 4 as shown in FIG. 3 involves the release tab 42 acting as part of a magazine locking mechanism in which the release tab 42 has a protruding sawtooth-shaped locking catch 18 in the vicinity of the fulcrum bar 43 which takes the place of the protrusion 18 on the magazine side panel 11 and engages with sawtooth-shaped springs in the magazine holder in order to lock the magazine in position when fully inserted in the magazine holder.

The invention has been described in detail with particular reference to certain preferred embodiments thereof, but it will be understood that variations and modifications can be effected within the spirit and scope of the invention.

We claim:

1. A magazine for holding a plurality of disks comprising;

means defining disk-holding compartments, a plurality of disk drawers each adapted to hold a single disk mounted in disk-holding compartments, and a single common disk drawer locking mechanism pivotally mounted, by which all of the disk drawers are lockable in and releasable from the magazine by actuating the single, common disk drawer locking mechanism, wherein the single common disk drawer locking mechanism and the magazine are formed as a one-piece injection molded unit in plastic, and wherein e since common disk drawer locking Mechanism includes a locking catch, a release tab, and a common elastic fulcrumb pivotally mounting both the Jocking catch and the release tab so that when the release tab is pivoted the common elastic fulcrum bar acts a spring.

2. The magazine in accordance with claim 1, characterized in that the disk drawers each have a locating recess and the locking catch protrudes into the inside of the disk drawers and has outer end locating tabs or pins which engage in the locating recess in the disk drawer, and the release tab protrudes outwards from the magazine in such a way that when it is depressed inwards against the spring action of the common elastic fulcrum bar, the locating tabs of the locking catch are lifted free of the locating recesses in the disk drawers.

3. The magazine in accordance with claim 2, characterized in that the locating tabs of the single common disk drawer locking mechanism and the locating recesses in the disk drawers are positioned and arranged in such a way that they lock the disk drawers in the fully inserted position inside the magazine.

4. The magazine in accordance with claim 1, characterized in that the locking catch, the release tab and the common elastic fulcrum bar arc formed by making cut-outs in the magazine.

5. The magazine in accordance with claim 1, characterized in that the release tab is operated either manually or by inserting the magazine in a magazine holder of a recording and playback device for compact disks.

6. A magazine for holding a plurality of disks comprising;

means defining disk-holding compartments, a plurality of disk drawers each adapted to hold a single disk mounted in disk-holding compartments, and a single common disk drawer locking mechanism pivotally mounted, by which all of the disk drawers are lockable in and releasable from the magazine by actuating the single, common disk drawer locking mechanism, wherein the magazine further includes a carrying handle, characterized in that the single common disk drawer locking mechanism, the carrying handle and the magazine are formed as a one-piece injection molded unit in plastic, and wherein the carrying handle is a U-shaped bracket, wherein one of the ends of the U-shaped bracket is integrally formed with the single common disk drawer locking mechanism and allows lateral movement toward a side panel of the magazine by a common elastic fulcrum bar of the single common disk drawer locking mechanism joined to the one side panel, and wherein the other end of the U-shaped bracket is joined to an opposite side panel of the magazine by a second elastic fulcrum bar and allows lateral movement away from the opposite side panel, so that the single common disk drawer locking mechanism is actuatable and pivotable by the carrying handle either manually or by inserting the magazine in a magazine holder of a recording playback device for compact disks.

7. The magazine in accordance with claim 6, characterized in that a release tab of the single common disk drawer locking mechanism, joined to the one end of the U-shaped bracket has a locking catch for locking the magazine in the magazine holder of the recording and aback device for compact disks.

* * * * *